July 18, 1933.  J. F. CULP  1,918,959
ADJUSTABLE VALVE
Filed May 21, 1930
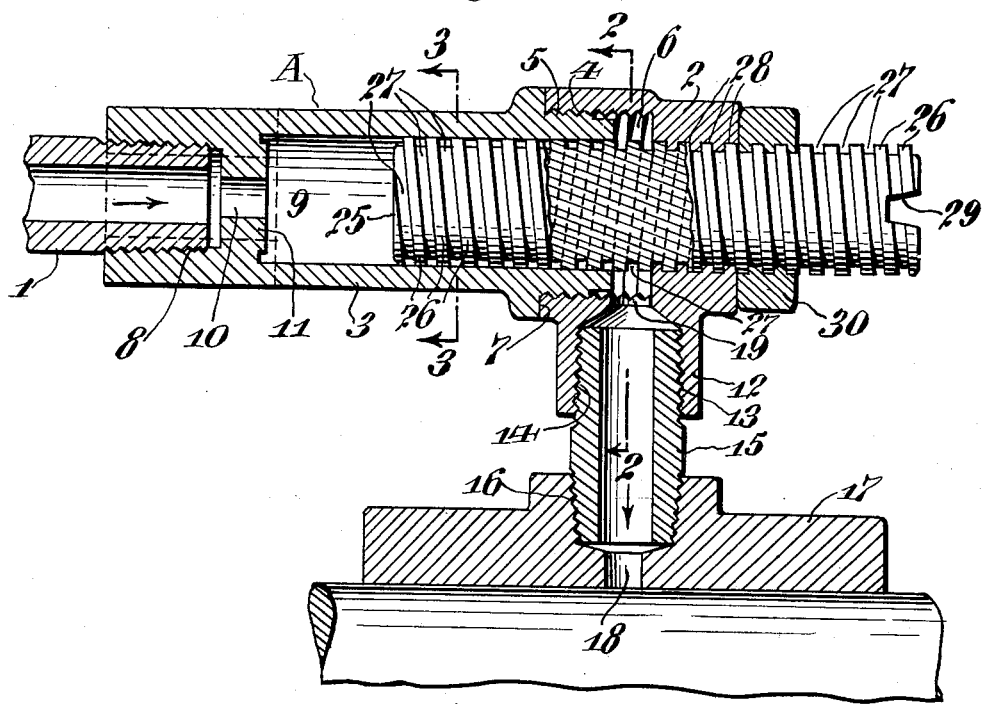
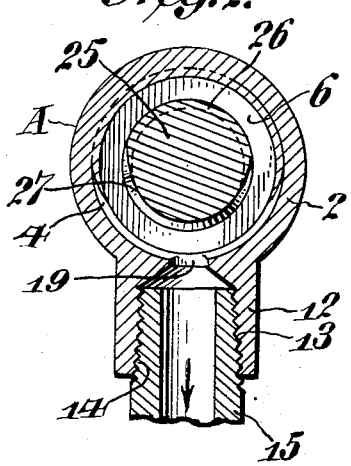
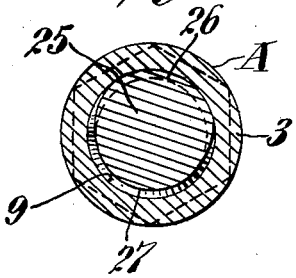
Inventor
John F. Culp
BY
Cyrus N. Anderson
Attorney Patented July 18, 1933

1,918,959

UNITED STATES PATENT OFFICE

JOHN F. CULP, OF PHILADELPHIA, PENNSYLVANIA, ASSIGNOR TO IDEAL LUBRICATOR COMPANY, OF PHILADELPHIA, PENNSYLVANIA, A CORPORATION OF DELAWARE

ADJUSTABLE VALVE

Application filed May 21, 1930. Serial No. 454,261.

My invention relates to adjustable valve structures of the type adapted to control the flow of a liquid or semi-liquid through a pipe to a selected destination.

The invention primarily relates to adjustable valve devices which are adapted especially for use for controlling the supply of grease or its equivalent through a pipe to a bearing of a mechanical structure for lubricating the same.

In many cases the practice is to employ grease as a lubricant, the same being supplied under pressure. It is desirable that the means for controlling the passage of the grease to the bearing shall be adjustable to meet different conditions of softness or fluidity due to variations of temperature or other causes so that the quantity of lubricant applied to a bearing or bearings may be controlled and regulated.

The general object of my invention is to provide a device of novel construction including a housing and a valve member therein, which housing is provided with an opening extending therethrough axially or longitudinally thereof to one end of which lubricant is supplied to the said adjustable valve member, and the said housing also being provided with an opening through one side thereof through which lubricant is discharged, means being provided for conveying the lubricant to a bearing or the like to be lubricated. The said valve member is provided with a helical passageway one portion of which is always fully exposed to the opening in the side of the said housing regardless of the position to which the movable valve member may be adjusted in the said housing.

It also is an object of the invention to provide a device for controlling and regulating the flow of a lubricant therethrough to a bearing to be lubricated which includes means whereby the regulation of the flow may be effected positively and with extreme accuracy.

To the foregoing and other ends my invention comprehends the construction as hereinafter described in detail, particularly set forth in the claims and as illustrated in the drawing wherein I have shown an embodiment of my invention in the form which at present is preferred by me. However, it should be understood that the invention is susceptible of embodiment in other forms of construction than that disclosed and that changes in the details of such construction may be made within the scope of the claims without departing from the said invention.

In the drawing:

Fig. 1 is a view in longitudinal sectional elevation of a device embodying the invention and also showing portions of a bearing and a member journaled therein, and also showing a portion of a pipe connected to the said device through which lubricant is supplied;

Fig. 2 is a view in transverse section taken on the dash and dot line 2—2 of Fig. 1; and Fig. 3 is a similar view taken on the line 3—3 of Fig. 1.

In the drawing I have shown at 1 a pipe through which a lubricant, such as grease, is adapted to be supplied to one end of a casing or housing A of a device embodying the invention. The said housing comprises parts 2 and 3 which are detachably secured to each other. The part 2 is of greater diameter than the part 3 and is provided with an internally screw-threaded opening 4 in the inner end thereof with which is engaged the externally screw-threaded inner end portion 5 of the part 3. The length of the portion 5 is less than the length or depth of the portion 4 so that when the portion 5 is screwed into the screw-threaded opening 4 of the portion 2 a space 6 is left between the inner end of the portion 5 and the bottom of the screw-threaded opening 4. The extent to which the member 3 may be screwed into the member 2 is limited by the shoulder 7 upon the member 3 against which the inner end of the member 2 abuts.

The outer end of the part 3 of the casing or housing is provided with an internally screw-threaded opening 8 with which is engaged an end of the pipe 1. The screw-threaded opening 8 is in communication with the interior of the enlarged opening 9 of the inner portion 3 through an opening 10 of relatively small diameter which is provided in the partition or dividing wall 11.

The portion 2 of the casing or housing is provided with a tubular projection 12 which is interiorly screw-threaded, as indicated at 13, for the reception of the screw-threaded end portion 14 of the short coupling pipe 15 the opposite end portion of which has screw-threaded engagement with a screw-threaded opening 16 which is in communication with the interior of the bearing 17 through a reduced opening 18. The bottom of the screw-threaded opening of the projection 12 is in communication with the space 6 through an opening 19 in the side of the part 2 of small diameter as compared with that of the screw-threaded opening 13 of the projection.

For the purpose of controlling the flow or passage of a lubricant, whether of grease or an equivalent flowable or flowing material, I have provided an adjustable valve member 25 consisting of a cylindrical member having a helical theread 26, the presence of which provides a helical passageway 27. The thread 26 is in slidable engagement with the wall of the housing and is in engagement with a helical thread 28 provided upon the inner side of the outer end portion of the member 2 of the housing. For the purpose of adjusting the adjustable valve member 25 in the housing I have provided the outer end thereof with a slot 29 which is adapted to be engaged by a suitable tool for rotating the said valve member. After the latter has been adjusted to any position desired in the housing it is held in such position by means of a lock nut 30 which is screwed into clamping or binding relation to the outer end of the member 2, as shown in Fig. 1 of the drawing.

The internal threads 28 are so related to the portion 2 of the housing and to the opening 19 in the side thereof that regardless of the position to which the said valve member 25 may be adjusted one turn of the helical groove 27 extends substantially diametrically across the said opening 19. By this arrangement the lubricant, after it has traveled through the helical groove 27 from the inner end thereof to the said opening 19, is free to escape from the latter and thence to the interior of the bearing 17.

By reason of the shape and size of the helical groove 27 and the fact that it is in no way restricted at the point of discharge of the lubricant therefrom into the pipe 15 the resistance offered by the flow or passage of lubricant through the adjustable valve control device will not vary after the adjustable valve member has been adjusted to the position desired. The total resistance offered by the valve to the passage of lubricant from the pipe 1 into the interior of the housing and therefrom through the opening 19 will depend upon the position to which the movable valve member 25 shall have been adjusted within the said housing.

If the movable valve member 25 is adjusted inwardly the length of the portion of the helical groove 27 through which lubricant must travel before it escapes therefrom through the opening 19 is increased and therefore the resistance offered to the flow or passage of the lubricant past the said valve member is increased. If, on the other hand, the said valve member is adjusted outwardly or in the opposite direction the length of the portion of the said helical groove or passageway through which the lubricant must pass is decreased; consequently the resistance offered to its flow or passage through the valve control device is decreased. It will be understood that the lubricant is under pressure which preferably should be continuous although continuous pressure is not essential.

It will be noted that the exterior diameter of the thread 26 is substantially equal to the diameter of the opening 9 in the member 3 of the housing. The clearance is sufficient only to permit adjustment of the valve member 25 inwardly and outwardly within the said opening 9. It follows, therefore, that the helical groove 27 of the valve member 25 constitutes the only passageway for the lubricant between the valve member 25 and the inner side of the wall of the portion 3 of the housing A.

It is to be observed that the pressure for driving the lubricant through the valve control device is exerted lengthwise thereof and that the opening in the side 2 of the housing is located at a point intermediate the ends of the member 2 and constitutes in effect means for releasing the pressure exerted upon the lubricant in the housing to thereby avoid or reduce to a minimum the possibility of leakage of lubricant through the screw-threaded outer end portion of the member 2.

Although in the construction as illustrated the lubricant is conducted from a side of the housing to the bearing to be lubricated yet I desire it to be understood that the lubricant may be supplied through the opening in the side of the housing and caused to flow through the device in a direction opposite to that as shown and described. In the latter case the pipe 1 would be connected to the bearing to be lubricated while the pipe 15 would be connected to the source of lubricant supply.

It will be seen that by my invention I have provided a device of extremely simple construction having means whereby the opening 19 is at all times in free and unobstructed communication with a portion of the helical groove 27. By this means the same relationship and condition between the adjustable valve member 25 and the passageway for the discharge of lubricant therefrom is maintained at all times regardless of the position to which the valve member 25 may be adjusted; and also it will be seen that when the valve member has been adjusted to a certain predetermined position if the lubricant is held under constant pressure the same amount of lubricant will be discharged at all times provided, of course, that the characteristics of the said lubricant as to fluidity or flowability are not altered.

Having thus described my invention, what I claim and desire to secure by Letters Patent is:

1. An adjustable valve device for controlling and regulating the flow of a lubricant to a bearing, the said device comprising a housing, said housing having an opening in a side thereof, means for supplying lubricant to the said housing, a pipe having connection with said housing and being in communication with said opening for supplying a lubricant from the said device to the bearing to be lubricated, the interior of the outer end portion of said housing being provided with a helical thread, and an adjustable valve member having a helical thread the presence of which provides a helical groove, the said helical thread upon the said valve member engaging the thread upon the interior of the said housing and slidably engaging the wall of the housing so that upon rotation of the said valve member lengthwise adjustment thereof is effected, and the said valve member being so related to the said housing that the said supply means and a portion of the said helical groove are at all times in free and unobstructed communication with the said opening through the side of said housing.

2. An adjustable valve device for controlling the flow of a grease lubricant to a bearing to be lubricated, said device comprising a two-part housing, means for connecting the said parts together, the interior of the outer end portion of one of said parts being provided with a helical thread, the said last mentioned part being provided with an opening in a side which is in communication with the interior thereof, a pipe for supplying lubricant to said housing, a pipe having connection with said housing and being in communication with the said opening for supplying lubricant from said housing to said bearing, and a valve member having a helical thread slidably engaging the wall of the housing and which is in engagement with the helical thread upon the interior of the said outer end portion of one of the parts of said housing, the presence of said helical thread upon said valve member providing a helical groove, and the said valve member being so related to the said housing that said pipe for supplying lubricant to the housing and a portion of said groove are at all times in free and unobstructed communication with the said opening regardless of the position to which the said valve member may be adjusted in said housing.

3. An adjustable valve device for controlling the flow of a grease lubricant to a bearing to be lubricated, said device comprising a housing consisting of two parts, one of the said parts having an internally screw-threaded opening in its inner end and the other of said parts having upon its inner end an externally screw-threaded portion for engaging the internally screw-threaded portion of the first named part, and the second named part being provided with a shoulder to limit the extent of adjustment of the said two parts toward one another, the first named part being provided with an opening in its side which is located beyond the inner end of the second named part and also being provided with a projection having an opening in alinement with the said side opening, a pipe secured in the opening of said projection and being in communication with the bearing to be lubricated for conveying lubricant thereto, the outer end portion of the first named part having an internal helical thread, and a cylindrical valve member having an external helical thread slidably engaging the wall of the housing and in engagement with said internal helical thread and providing a helical groove, a portion of which groove and the supply means being in free and unobstructed communication with said side opening, the said valve member being adjustable in the said housing to vary the resistance offered to the flow of lubricant therethrough to the said side opening.

4. An adjustable valve device for controlling the flow of a lubricant to a bearing to be lubricated, said device comprising a housing open at one end and provided with a helical thread upon the interior of said end, said housing being provided with a chamber constituting a reservoir near its outer end and also having an opening in the side thereof in communication with the said reservoir, a valve member extending into said housing and having a helical thread slidably engaging the wall of said housing and in engagement with the first named helical thread, a portion of the groove provided by the helical thread of said valve member being at all times open and freely exposed to the opening in the side of the said housing.

5. An adjustable valve device for controlling the flow of a lubricant to a bearing to be lubricated, said device comprising a housing consisting of two parts, the inner end of one of the said parts being internally screw-threaded to receive the externally screw-threaded inner end portion of the other part, the outer end of the first named part being open and being provided with an internal helical thread and the said first named part being provided with an opening in its side, the interior of the second named part of said housing being smooth and of cylindrical shape, means for supplying lubricant to said housing, and an adjustable valve member having a helical thread in engagement with the helical thread in the outer end of the first named member of said housing, the presence of the said helical thread upon the said adjustable member providing a helical groove which at all times has free and unobstructed communication with the supply means and the opening in the side of the said first named member of the housing, and the diameter of the said adjustable member being substantially equal to the diameter of the interior of the said second named part of the housing.

6. An adjustable valve device for controlling the flow of a lubricant to a bearing to be lubricated, said device comprising a housing one end of which is open, and the interior of the open end portion of said housing being provided with a helical thread, and said housing having an opening in its side in predetermined relation to the inner end of said helical thread, means for supplying a lubricant to the said housing, and an adjustable valve member mounted in the said housing having a helical thread slidably engaging the wall of the housing and in engagement with the helical thread of the said housing, the helical thread of the said adjustable valve member providing a helical groove in the said valve member, and the relation of the opening in the side of said housing to the helical groove of the latter being such as to cause a portion of the groove in the said adjustable valve member to be at all times in free and unobstructed communication with the said side opening.

JOHN F. CULP.